March 7, 1950 — S. X. SHORE — 2,499,788
PIEZOELECTRIC CRYSTAL TESTING APPARATUS
Filed Feb. 7, 1944 — 2 Sheets-Sheet 1

SIDNEY X. SHORE
INVENTOR.

BY
ATTORNEY

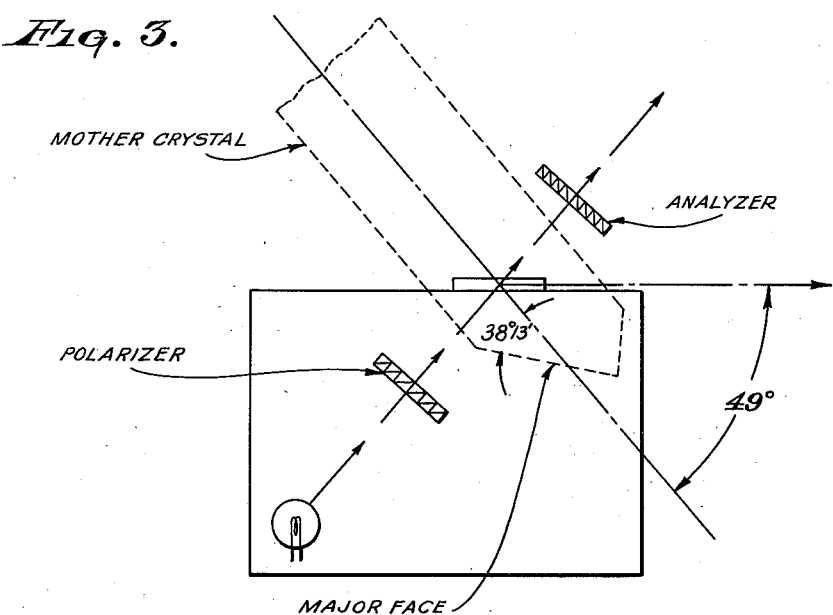
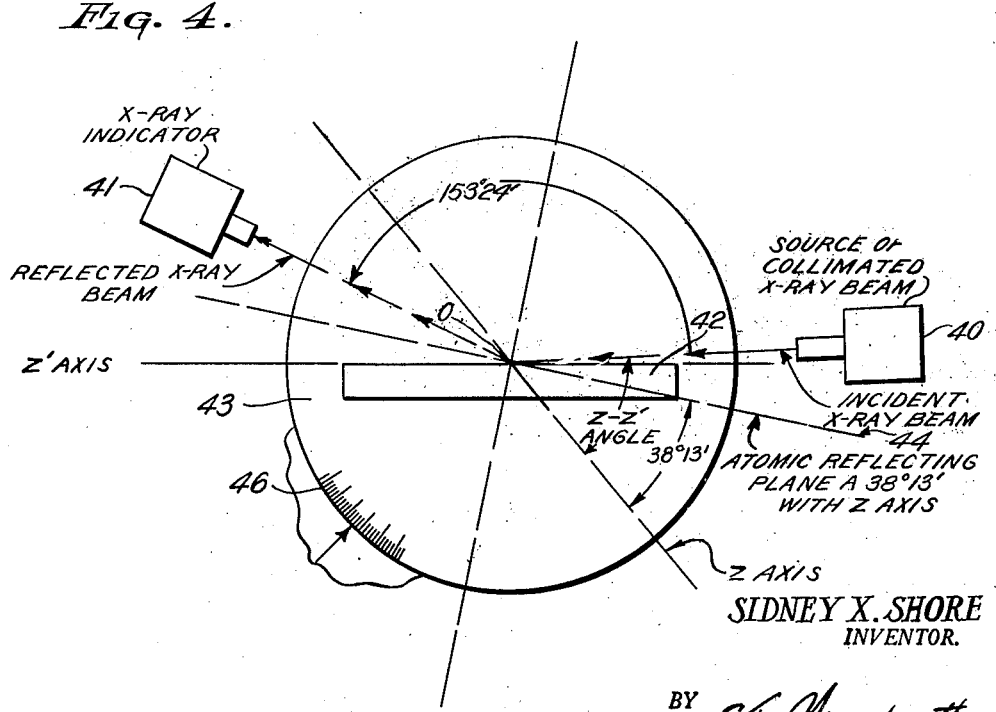

Patented Mar. 7, 1950

2,499,788

UNITED STATES PATENT OFFICE 2,499,788

PIEZOELECTRIC CRYSTAL TESTING APPARATUS

Sidney X. Shore, New York, N. Y., assignor, by mesne assignments, to Philips Laboratories, Inc., Irvington-on-Hudson, N. Y., a corporation of Delaware Application February 7, 1944, Serial No. 521,400

1 Claim. (Cl. 250—53)

My invention relates to piezo-electric crystals and more particularly to a method and device for determining the angle of cut of a crystal wafer, blank or bar with respect to the electrical, mechanical and optical axes of the mother crystal.

In the manufacture of piezo-electric quartz bodies it is essential that the surfaces of the crystal wafer, blank or bar (hereinafter to be broadly referred to as a crystal wafer) be properly oriented with respect to the electrical, mechanical and optical axes of the mother crystal. This is particularly necessary in the case of wafers which are cut at an angle with respect to the optical axis of the crystal in which instance the sense of the angle of cut i. e. whether the angle is positive or negative, must also be taken into consideration if the finished piezo-electric element is to exhibit the required activity, frequency and frequency stability. The electrical, mechanical and optical axes are commonly designated as the X, Y, and Z axes respectively and will be so referred to hereinafter.

Generally the sense of the orientation of the wafer is determined by the orientation of its surfaces with respect to a defined reference plane of the mother crystal. Such a plane is for example, a plane parallel to the major apex face of the mother crystal which plane is parallel to an X-axis and makes an angle of 38°13' with the Z-axis. This major apex face usually may be determined by inspection of the mother crystal when the crystal has regular surfaces. However, in the case of so-called "river washed" quartz or crystals consisting of irregular fragments of larger crystals, the major apex face is not readily identified and it is difficult to ensure the attainment of proper orientation of the surfaces of the crystal wafer. Furthermore, even when the axes of the mother crystal are positively identified, it is difficult to ensure that the crystal wafer cut therefrom is properly oriented because of errors in setting up the mother crystal for cutting, creepage of the saw blade etc. and it is often found that the wafer is not cut in its desired orientation as evidenced by departures of the final crystal element from its predetermined desired characteristics.

Heretofore it has not been readily feasible to check the orientation of a crystal wafer because the removal of the wafer from the mother crystal removes all usual markings by which the reference planes may be identified and the sense of orientation of the major surfaces of the blank with respect to the crystal axes could not be determined.

It is an object of the invention to provide a method and device for determining the absolute position of the projection of the optical axis on the major surfaces of a cut crystal wafer or blank.

Another object of the invention is to provide a method and apparatus for determining the degree and sense of the orientation of the major surfaces of a crystal blank with respect to the axes of the mother crystal.

A further object of the invention is to provide a method of determining the angle between the projection of the optical axis on the major surfaces of a crystal blank or wafer and the optical axis of the mother crystal.

A still further object of the invention is to provide a method of determining the symmetry of the major surfaces of a crystal wafer or blank with respect to the electrical axis of the mother crystal.

In accordance with the invention the above objects are achieved by a method and device in which a plane polarized light beam is passed through the crystal wafer at an oblique angle to the major surfaces thereof and the amount of apparent rotation of the plane of polarization of the light beam so produced is observed by means of a suitable analyzer.

More specifically, I determine the absolute direction of the projection of the Z-axis on the major surfaces of the wafer by passing through the wafer a light beam which is selectively rectilinearly polarized in one of two planes, a first plane which is perpendicular to one of the major surfaces of the crystal and which contains the axis of the light beam and/or a second plane normal to the first plane and containing the axis of the light beam. Furthermore, the light beam makes an oblique angle with the wafer surface approximating the angle at which the wafer is cut with respect to the Z-axis. The wafer is then rotated about an axis perpendicular to its major surfaces and the beam transmitted therethrough is observed through a suitable polarizing analyzer. I have found that at the position where minimum apparent rotation of the plane of polarization of the light beam occurs, the projection of the Z-axis on the surface of the wafer coincides with the projection of the light beam and that the direction of the Z-axis (positive direction being towards the apex of the mother crystal) is in the direction of the light beam.

The foregoing is brought about by reason of the following: Owing to the birefringent properties of quartz, the space velocity surfaces representing the "ordinary" and "extraordinary" ray velocities in various directions are a sphere and an ovaloid, respectively, with the major axis of the ovaloid equal in length to the diameter of the sphere and lying parallel to the Z-axis direction. An incident ray of plane polarized light striking the quartz is broken into the "ordinary" and "extraordinary" rays which are polarized perpendicular to each other. In all directions except parallel to the optic axis, the two rays are out of phase on recombining at the emergent surface of the quartz and the resultant ray is, in the general case, elliptically polarized.

For the special case where the incident plane polarized ray has a direction of polarization parallel to the plane of polarization of either the "ordinary" or "extraordinary" ray, there will be no breakdown of the incident ray into two components, but it will emerge polarized in the same direction as it entered the quartz, either as the "ordinary" or the "extraordinary" ray.

When the quartz is rotated so that the plane of polarization of the incident ray is not coincident with the plane of polarization of either the "ordinary" or the "extraordinary" ray, the incident ray will break down into two components polarized perpendicular to each other with intensities proportional to the cosine of the angle between the plane of polarization of the incident ray and the planes of polarization of the "ordinary" and "extraordinary" rays respectively.

After so determining the absolute direction of the projection of the Z-axis I determine the angle of the major faces by impinging on the wafer an X-ray beam the projection of which on the wafer surface coincides with the projection of the Z-axis whereby a desired reference atomic reflecting plane of the crystal can be located and correspondingly the angle of the wafer surfaces with respect to the Z-axis may be readily determined.

I have further found that if the variations in light intensity observed through the analyzer are plotted as a function of the degree of rotation of the wafer about an axis perpendicular to its surface, there occur two spaced regions of maximum light intensity, each positioned on one side of a plane perpendicular to the wafer and passing through the projection of the Z-axis.

The invention will be described in greater detail with reference to the appended drawing forming part of the specification and in which:

Figure 3 is a phantom diagram showing the orientation of a mother crystal with respect to the apparatus of Figure 1 when the crystal wafer is oriented so as to produce minimum rotation of the plane of polarization of the polarized light and accordingly minimum transmission of light through the analyzer.

Figure 4 diagrammatically illustrates apparatus for measuring the angle between the wafer surfaces and the Z-axis of the crystal.

Figure 1:
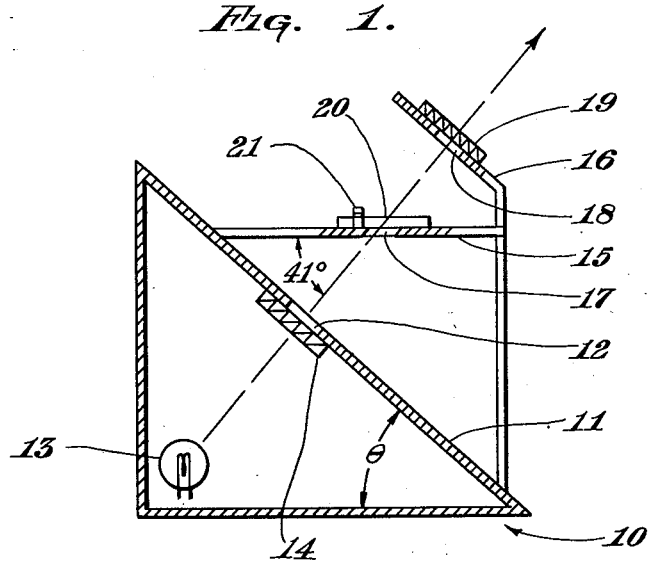
Figure 1 illustrates one form of apparatus in accordance with the invention for determining the sense and direction of the Z-axis of a crystal wafer in accordance with the principles of the invention.

Referring to Figure 1, the device shown comprises a case 10 having a sloping front section 11 apertured at 12. Within the case 10 is a lamp 13 and over the aperture 12 is a light polarizing element 14 such as a "Polaroid" element or a Nicol prism so positioned as to polarize the light derived from the lamp 13 in one of two planes, a first plane perpendicular to a major surface of a quartz wafer 20 and containing the axis of the light beam, and a second plane perpendicular to the first plane and containing the axis of the light beam. Also supported on the section 11 is a horizontally positioned table 15 which in turn supports a sloped frame 16 parallel to the section 11. Table 15 and frame 16 are apertured at 17 and 18 respectively said apertures being in line with each other and with the aperture 12 of the section 11. Supported on the frame 16 and positioned over the aperture 18 is a polarizing analyzer 19 for example a Nicol prism, the analyzer being positioned parallel to the element 14 and having its plane of polarization perpendicular to the plane of polarization of element 14.

The quartz wafer to be inspected shown as 20, is positioned on the table 15 over the aperture 17. A rigid straight edge 21 for example a strip of metal or taut wire, is fastened to the table 15 in such manner as to allow the wafer 20 to slide between it and the table and is so oriented as to be perpendicular to the light beam and parallel to the horizontal table 15.

Figure 2:
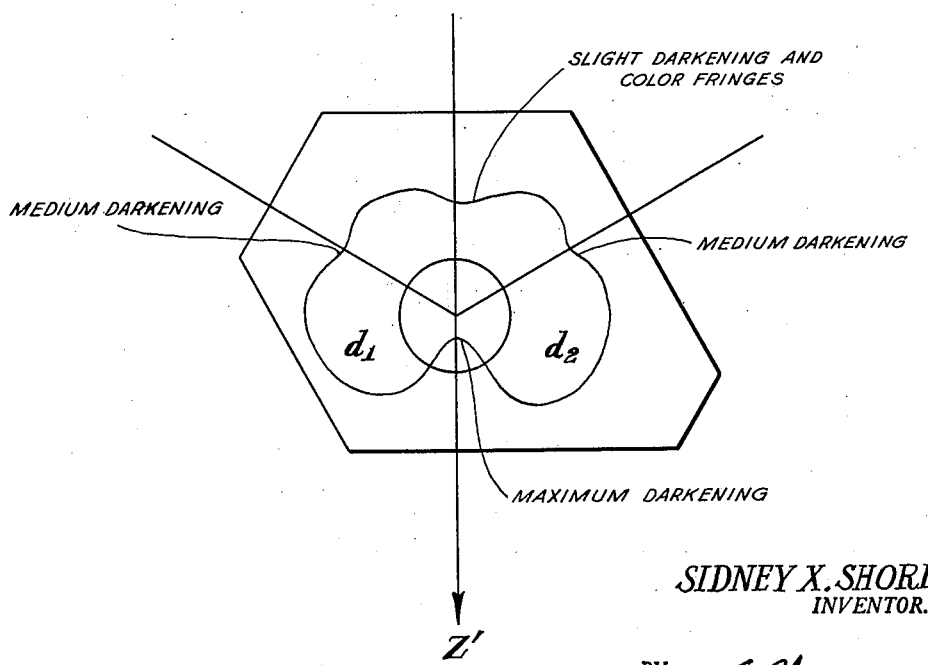
Figure 2 is a polar graph illustrating variations in light intensity of the polarized light beam as seen through the analyzer when the crystal wafer is rotated about an axis perpendicular to its major surfaces in the apparatus according to the invention.

The slope of the section 11, e. g. the value of the angle $\theta$ made by the section 11 with the horizontal, and correspondingly the slope of the frame 16 is preferably made to approximate the angle assumed to exist between the major surfaces of the crystal wafer and the Z-axis of the mother crystal. However, as later to be more fully pointed out, the angle $\theta$ may be widely divergent from the angle of the crystal axis and not substantially affect the operation of the device. The operation of the device is as follows:

The crystal wafer to be tested is positioned over the aperture 17 and rotated about a vertical axis during which time the wafer is inspected through the polarizing analyzer 19. Rotation of the wafer 20 about its vertical axis correspondingly varies the degree of rotation of the polarized beam emanating from the polarizing element 14 and this effect is visually observed through the analyzer 19 and appears as a variation of the intensity of the light transmitted through the analyzer. Such variations in light intensity produced in a typical case by rotation of the wafer 20 have been plotted in the polar graph of Fig. 2. At one position of the wafer there will be a minimum of light transmitted through the analyzer such being shown in Fig. 2 as the position at which minimum apparent rotation of the plane of polarization of the light by the wafer and maximum darkening occurs. At this position the wafer is so oriented that the projection of the Z-axis on the wafer surface is contained in a plane perpendicular to the table 15 and parallel to the light beam and the sense of the direction of the optical axis is positive in the direction of the light beam. This direction of the projection of the Z-axis is perpendicular to straight edge 21 and may be so marked. If the wafer so oriented were to be replaced in the mother crystal it would be found that the apex of the mother crystal points towards and downward with respect to the case of a wafer cut at an angle of minus 49° with respect to the Z-axis as has been shown in Fig. 3 wherein the position of the mother crystal is shown in phantom. By penciling on the upper wafer surface a line parallel to the plane which is perpendicular to the table 15 and which is parallel to the light beam and marking the line with an arrow pointing towards the observer, the direction and sense of the projection of the optical axis is marked on the wafer surface. Such a line will coincide with the projection of the Z-axis on the surface of the wafer and the arrow marked thereon will point in the direction of the apex of the mother crystal. Alternatively, a line perpendicular to the projection of the Z-axis may be penciled on the surface of the wafer with an arrow pointing towards the observer marked on the wafer to indicate the sense of the Z-axis direction. Such a line will coincide with the projection of the X-axis on the wafer surface and the arrow will point in the direction of the apex of the mother crystal.

The crystal wafer so marked is placed in an X-ray diffraction apparatus for the absolute determination of the angle between the wafer surface and the Z-axis, i. e. the Z—Z' angle. Such an apparatus is shown schematically in Fig. 4 wherein 40 represents a source of a collimated X-ray beam, i. e. an X-ray tube with a collimator for the emerging beam, 41 indicates an X-ray indicator such as an ionization chamber, 42 represents a crystal wafer the angular orientation of the major surfaces of which is to be determined with respect to the Z-axis, and 43 represents a rotatable pedestal having a center at 0. In accordance with established practice, the X-ray beam is parallel to the surface of the pedestal and is directed towards the center of rotation thereof.

The wafer 42 is mounted on the pedestal with its Z'-axis parallel to the surface of the pedestal so that the incident X-ray beam and the Z'-axis lie in a plane parallel to the surface of the pedestal. The angular position of the X-ray indicator 41 with respect to the source 40 is determined by the particular atomic reflecting plane selected in the crystal as the reference plane. For example, when using as a reference plane the atomic reflecting plane making an angle of 38° 13' with the Z-axis the angle between the indicator 41 and the source 40 is made 153° 24'. Other atomic reflecting planes existing in the quartz crystal, may be used as the reference plane. Such other reference planes, and their angular position with respect to the axes of the crystal, and the angle at which the source 40 and the indicator 41 are to be positioned relative to each other to produce the greatest response in the indicator 41 when refracting the X-ray beam from such other reference planes, are known to those skilled in the art and full information concerning the same is generally available in the literature pertaining to the refraction of X-ray beams by such crystals.

The arrow drawn on the surface of the blank indicates the direction of the Z'-axis which is the projection of the Z-axis upon the surface of the blank. To measure the dihedral angle formed by the plane of the wafer surface and the atomic reflecting plane the X-ray beam is introduced at such an angle, i. e. along the line of the arrow, that its projection on either plane of the dihedral angle makes an angle of 90° with the intersection of the dihedral planes i. e. the projection of the X-ray beam on the wafer surface is made to coincide with the Z'-axis as above noted.

With the crystal wafer positioned as above described on the pedestal, the pedestal and the wafer are rotated about the center 0 until maximum reflection of the X-ray beam is obtained at the indicator 41. At this position of the wafer, the atomic reflecting plane shown as 44 is perpendicular to the disector of the angle between the X-ray indicator 41 and the source 40. Since the direction of the plane 44 on the pedestal is now located, the angular direction of the major crystal wafer surfaces with respect to the atomic reflecting plane and correspondingly with respect to the Z-axis may be readily measured by means of a suitable protractor scale 46 affixed about the periphery of the pedestal.

From the foregoing and from a consideration of Fig. 4 it is apparent that both the direction and the sense of the Z'-axis are necessary to properly determine the Z—Z' angle. More particularly, by means of the knowledge derived from the method and apparatus described in connection with Figs. 1, 2 and 3, it is now readily possible to orient the wafer 42 with absolute certainty that the projection of the incident X-ray beam on the wafer surface is coincident with the Z'-axis. Furthermore, since the sense of the direction of the Z-axis is known—being indicated by the arrow marked on the wafer surface as previously described—the relative position of the plane of the wafer surface relative to the atomic reflecting plane is known thereby ensuring that the scale 46 indicates the angle which is in fact the desired Z—Z' angle sought to be measured and not the supplement of the Z—Z' angle.

As previously pointed out, the angle $\theta$ which the section 11 makes with the horizontal may diverge substantially from the assumed Z—Z' angle of the crystal wafer surface without significantly affecting the utility of the device or method of the invention. Where such divergence exists, it is found that the maximum darkening effect described in connection with Fig. 2 becomes slightly less pronounced.

In addition to providing a method of determining the sense and direction of the Z' axis the apparatus and method of the invention determines the symmetry of the crystal wafer faces with respect to the X-axis, i. e. whether the crystal faces are parallel or askew to the X-axis. Lack of symmetry of the crystal wafer faces with respect to the X-axis will modify the light pattern shown in Fig. 2 to produce a non-symmetrical arrangement of the light intensity variations. The invention also allows the marking of a line on the wafer which is parallel to the X-axis or the X projection of the X-axis on the plane of the wafer. Such a line which is perpendicular to the projection of the Z-axis on the wafer surface may be marked using the straight edge 21 as a guide.

A monochromatic light source or a series of color filters used with the white light source will make for easier detection of the extinction position. A split-field polarizer having two sections with polarizing directions inclined at several degrees to each other will provide a more accurate determination of the true extinction position. A position of the wafer showing a uniformly darkened field corresponds to the extinction position, and errors in the position of the wafer are magnified as one-half of the field brightens and the other half darkens.

Since the invention makes it possible to identify the position of the Z' axis with absolute certainty, it may be used to mark wafers so that oscillator or resonator plates may be diced in such manner that the edges make the same angle with the Z' or X-axis in each blank. This makes for the greatest possible reproducibility of results in manufacture. Differentiation between Z' and X-axes may be especially desirable in manufacturing rectangular rather than square piezo-electric elements. The pre-dimensioning of these elements designed to eliminate spurious frequency responses and activity variations requires accurate locating of these axes and their differentiation. In the usual manner of manufacture in which the dimensions may be altered individually, this invention facilitates this operation on the finished blank. The frequencies of the interfering coupled modes of vibration which may be caused by specific dimensions other than the fundamental dimension may thus be obviated. Grinding the edge dimensions provides the necessary alteration of the dimensions to change the frequency response of these coupled interfering modes of vibration. Such freedom from interference of other modes of vibration with the fundamental mode desired must be obtained if the crystal is to operate properly over a wide range of temperatures.

While I have described my invention by means of a specific example and in a specific embodiment, I do not wish to be limited thereto as obvious modifications will occur to those skilled in the art without departing from the spirit and scope of the invention.

What I claim is:

The method of determining the angle between the optical crystallographic axis and the projection of the optical crystallographic axis on the major surfaces of a piezo-electric crystal element cut from a quartz body, comprising the steps, impinging on a major surface of the crystal element a light beam forming an oblique angle with said major surface, selectively rectilinearly polarizing the said impinging light beam in one of two planes, a first plane perpendicular to the major surface of said crystal element and containing the axis of said light beam and a second plane perpendicular to said first plane and containing the axis of the light beam, rotating the crystal element about an axis perpendicular to the plane of the said major surface, analyzing the light beam transmitted through the element while rotating the element to a position of a minimum of rotation of the plane of polarization of the light beam, marking the so-positioned element to indicate the projection of the light beam on the surface of the element remote from the source of said light beam, further marking the so-positioned element to indicate that end of the projection of the light beam on said surface which is remote from the source of said light beam, impinging an X-ray beam on the surface of said element at an angle at which the projection of the X-ray beam on the surface of the element substantially coincides with the said projection of the light beam on said surface, reflecting said X-ray beam from an atomic reflecting plane within said crystal element having a known position with respect to the optical crystallographic axis of said crystal element to thereby locate the position of said atomic reflecting plane with respect to the incident X-ray beam, and measuring the angle between the axis of the incident X-ray beam and the surface of the wafer to thereby determine the angle between the surface of the crytsal element and the optical crystallographic axis.

SIDNEY X. SHORE.

REFERENCES CITED

The following references are of record in the file of this patent:

UNITED STATES PATENTS

| Number | Name | Date |
| --- | --- | --- |
| 1,766,037 | Dawson | June 24, 1930 |
| 2,151,736 | Broughton | Mar. 28, 1939 |
| 2,344,670 | Barlett | Mar. 21, 1944 |
| 2,377,862 | Bond | June 12, 1945 |

OTHER REFERENCES

"Manual of Petrographic Methods" by Albert Johannsen, published in 1918, by McGraw-Hill Book Co., pages 158, 303, 304, 414 and 487–494.